United States Patent [19]

McCormick-Goodhart

[11] 4,260,250

[45] Apr. 7, 1981

[54] IMAGING APPARATUS

[75] Inventor: Mark H. McCormick-Goodhart, Grosse Pointe, Mich.

[73] Assignee: Energy Conversion Devices, Inc., Troy, Mich.

[21] Appl. No.: 139,179

[22] Filed: Apr. 11, 1980

Related U.S. Application Data

[63] Continuation of Ser. No. 961,693, Nov. 17, 1978, abandoned.

[51] Int. Cl.$^3$ .................. G03B 27/16; G03B 27/54
[52] U.S. Cl. ....................................... 355/113; 355/67
[58] Field of Search ............................ 355/67-71, 355/113-121, 5, 27, 28; 362/3, 297, 298, 301, 306, 346

[56] References Cited

U.S. PATENT DOCUMENTS

| | | | |
|---|---|---|---|
| 2,530,843 | 11/1950 | Smith | 355/70 |
| 3,734,614 | 5/1973 | Zahn | 355/67 |
| 3,844,655 | 10/1974 | Johannsmeier | 355/95 X |
| 3,923,394 | 12/1975 | Frankiewicz | 355/70 X |
| 3,966,317 | 6/1976 | Wacks et al. | 355/19 |
| 4,023,903 | 5/1977 | Scheib | 355/67 X |

Primary Examiner—L. T. Hix
Assistant Examiner—W. J. Brady
Attorney, Agent, or Firm—Wallenstein, Spangenberg, Hattis & Strampel

[57] ABSTRACT

Dry-process imaging apparatus for flash imaging an imaging film having a layer of an energy dispersible image forming material on a surface thereof. The apparatus comprises a source of electromagnetic or radiant energy, radiant energy collecting and guiding means, and support means including masking means for the imaging film. The apparatus is especially suitable for flash imaging microfiche cards, and enables an imaging energy source such as, for example, a Xenon flash tube, to be operated at lower energy levels for shorter time periods while achieving uniformity of energy distribution over a comparatively large area at the film plane.

8 Claims, 6 Drawing Figures

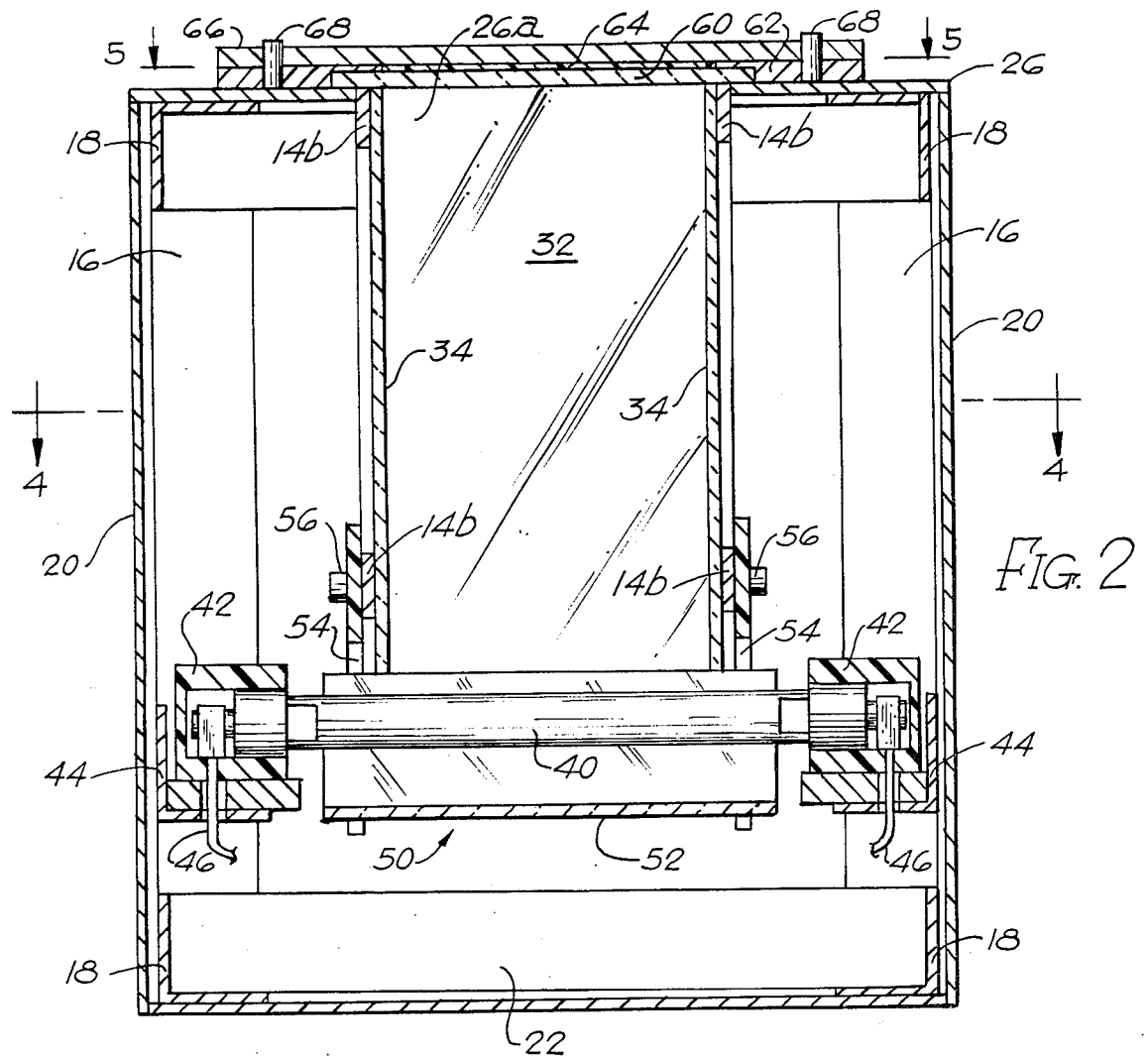
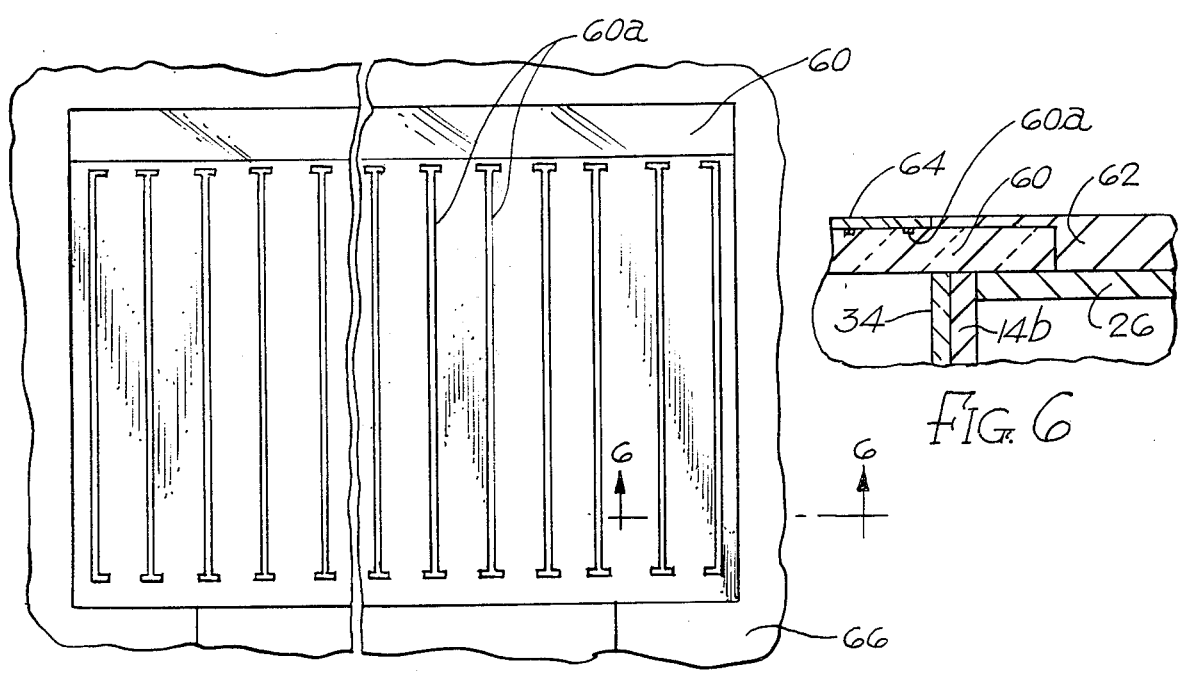

IMAGING APPARATUS

This is a continuation of application Ser. No. 961,693, filed Nov. 17, 1978, now abandoned.

The present invention relates to apparatus for dry-process, flash imaging an imaging film having a layer of an energy dispersible image forming material on a surface thereof.

Apparatus for dry-process, flash imaging an imaging film having a layer of an energy dispersible image forming material on a surface thereof is disclosed in U.S. Pat. No. 3,966,317. The apparatus shown in the patent includes an image transferring station where a single frame on a microform film is interposed over a microimaged frame in a mask film strip positioned above a glass window. A short pulse of energy, above a threshold value, emitted by a Xenon flash tube is passed through the glass window and the microimaged frame of the mask film strip onto the frame of the microform film which, preferably, is in the form of a microfiche or microform card. The energy pulse emitted by the Xenon flash tube is absorbed and scattered by the opaque areas of the microimaged frame of the mask film strip so as not to effectively reach the corresponding areas of energy dispersible material of the overlying frame of the microform film. However, the short energy pulse readily passes through the substantially transparent areas of the microimaged frame of the mask film strip to the corresponding overlying areas of energy dispersible material of the microform film where the energy pulse is absorbed. The absorption of the energy pulse by these areas heats the energy dispersible material to at least a softened or molten condition, whereupon the continuous layer of energy dispersible material at those areas is broken up and dispersed into small and widely spaced globules to make those areas substantially transparent. The dispersion of the energy dispersion material at the heated areas is occasioned, in the main, by the surface tension of the heated material which causes the heated material to form such small and widely spaced globules. After the globules are so formed by the short pulse of energy emitted by the Xenon flash tube, they quickly cool and remain in that globular condition to provide substantially transparent areas in the frame of the microform film.

Since the apparatus of U.S. Pat. No. 3,966,317 is concerned with microimaging only a comparatively small area, namely, a single frame of a microfiche or microform card, the greater proportion of the energy emitted by the Xenon flash tube is dissipated, resulting in inefficient use of the energy emitting capabilities of the flash tube and, concomitantly, a shortened useful life for the flash tube.

In accordance with the present invention, a dryprocess imaging apparatus is provided which not only enables high collection efficiency of the energy emitted by an energy source, such as an Xenon flash tube to be achieved thereby permitting the energy source to be energized at a lower potential for a shorter time, and, concomitantly, prolonging the useful life of the flash tube, but, also, enables the energy emitted by the energy source to be guided along a predetermined path to provide uniform illumination and desired collimation of the emitted energy at the film plane. As a result, larger areas of imaging film can be uniformly imaged with the apparatus enabling an entire microfiche card to be imaged with a single, short pulse of energy. The apparatus of this invention can be employed as a separate, self-contained unit for the production of non-image bearing microfiche cards having add-on capabilities, or for transferring microimages on conventional microfiche cards, such as diazo michrofiche cards which have no add-on capabilities, to cards having an energy dispersible imaging material layer thereon which imparts both add-on and annotative capabilities to the cards, and which, furthermore, have superior archival properties.

The apparatus, in brief, comprises an outer frame and an inner frame. Supported within the inner frame is a hollow, open-ended electromagnetic or radiant energy passageway or guideway means. In a preferred embodiment of the invention, the energy guideway means comprises a plurality of mirrors, the reflective surfaces of which form the walls of the energy guideway. One end of the guideway means is located adjacent to a source of electromagnetic or radiant energy, while the opposite end thereof is located adjacent to support means for the imaging film. The energy guideway can be altered to achieve uniform illumination and desired collimation of the energy at the film plane while at the same time providing high energy collection efficiency. The inner frame of the apparatus also carries radiant energy intercepting and reflecting means which is positioned on the side of the energy source opposite to that on which said one end of the energy guideway means is located, and is adapted to intercept and reflect radiant energy from the energy source in the direction of the energy guideway means. The energy intercepting and reflecting means advantageously can be adjusted with relation to the radiant energy source to achieve greater uniformity of distribution at the imaging film plane of the energy passing through the energy guideway means. The imaging film support means desirably is carried on the inner frame of the apparatus, and comprises a light transmitting body having a preselected pattern or image formed thereon which serves as a mask for contact imaging the film positioned on the support means. The outer frame is provided with means for connecting the radiant energy source to a source of power. The apparatus enables upwards of 80% of the energy emitted by the energy source to be collected and directed to the imaging film plane. The lower voltages used to energize the energy source, coupled with the shorter pulse widths required to achieve imaging can more than double the useful life of the energy source.

The foregoing, and other features and advantages of the imaging apparatus of this invention will become apparent to those skilled in the art upon reference to the accompanying specification, claims and drawings in which:

FIG. 2 is a sectional view taken substantially along line 2—2 of FIG. 1;

FIG. 5 is a fragmentary sectional view taken substantially along line 5—5 of FIG. 2; and FIG. 6 is a fragmentary sectional view taken substantially along line 6—6 of FIG. 5.

Figure 1:
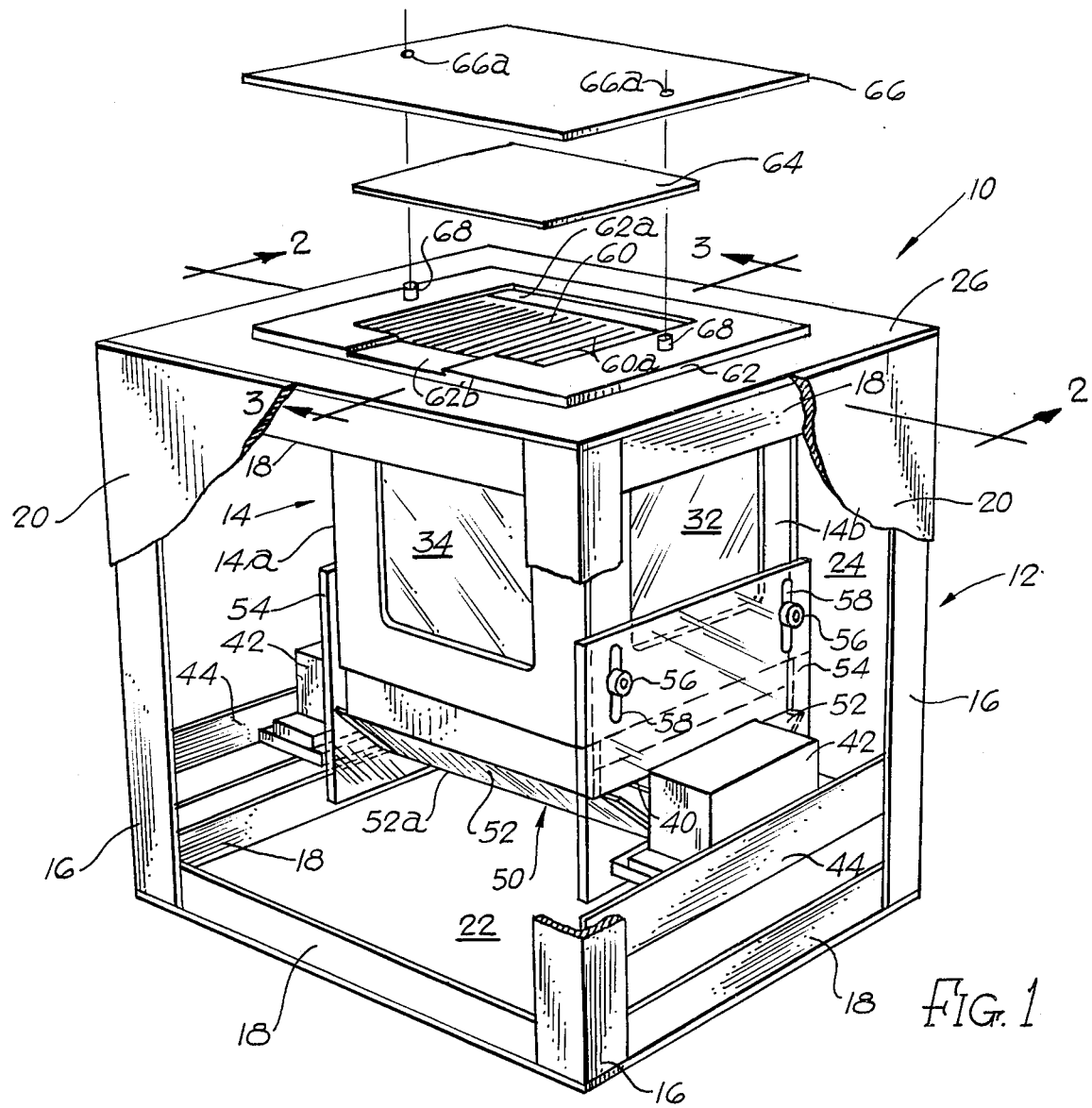
FIG. 1 is a view in perspective, partly in section and partly exploded, of an embodiment of the imaging apparatus.

Referring, now, in greater detail to the drawings, as best shown in FIG. 1, the embodiment of the imaging apparatus illustrated, and designated generally by reference numeral 10, comprises an outer frame 12 in which is supported an inner frame 14. The outer frame 12 is formed by four vertical, angled corner members 16 joined at their top and bottom margins to angled connectors or cross-pieces 18. The members 16 and 18 desirably are formed of metal, but can be made of a rigid plastics material, or the like. The outer frame 12 is provided with a bottom wall 22, a rear or back wall 24 and a top wall 26. The bottom wall 22 and the rear wall 24 advantageously are formed of an insulating material such as plastic, composition board, a compressed mineral aggregate, or the like. The top wall 26 of the frame 12 desirably is formed of metal, and has a centrally located, generally rectangular opening 26a provided therein, the purpose of which will become clear as the description proceeds. The sides and ends of the outer frame 12 may be enclosed with panels 20—20 to give the apparatus a finished appearance and to prevent unauthorized tampering with the interior of the apparatus.

The inner frame 14 of the imaging apparatus 10 comprises side walls 14a and end walls 14b which are secured along their upper margins to the top wall 26 of the outer frame 12 at the opening 26a therein.

Figure 4:
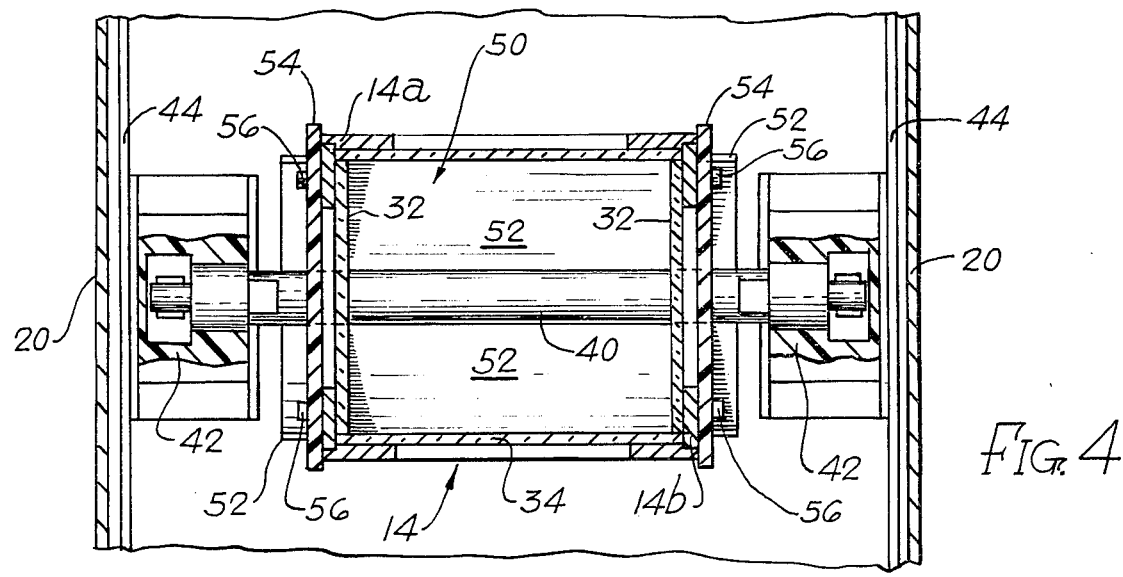
FIG. 4 is a fragmentary sectional view taken substantially along line 4—4 of FIG. 1.
Figure 3:
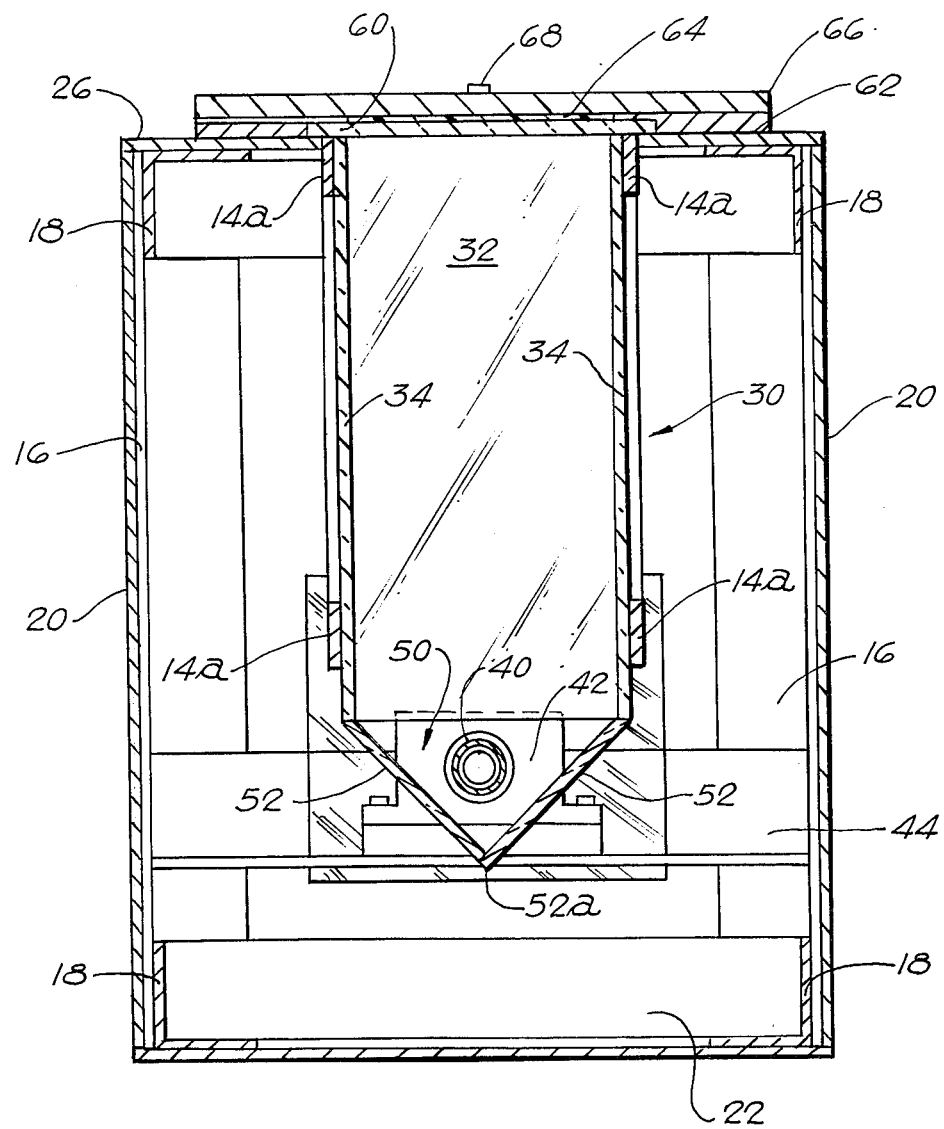
FIG. 3 is a sectional view taken at a 90° angle to the view of FIG. 2.

The inner frame 14 of the apparatus serves as a support for a hollow, open-ended, electromagnetic or radiant energy intercepting and guiding element 30. In the embodiment of the invention illustrated, the radiant energy intercepting and guiding element 30 comprises two pairs of mirrors 32—32 and 34—34 positioned with their reflective surfaces in opposed relation to one another and arranged to form a hollow, elongated, open-ended, rectangular passageway. As best shown in FIG. 4, the end mirrors 32—32 are slightly narrower in width than the side mirrors 34—34, and are joined by their margins along the margins of the side mirrors 34—34. To this end, a suitable adhesive such as an epoxy resin may be used to secure the mirrors in position. The backs of the mirrors, in turn, are secured to the walls 14a and 14b of the inner frame 14. While the mirrors 32—32 and 34—34 may be of various types, they preferably are front surface aluminum coated type mirrors.

Positioned below the inner frame 14 and its associated radiant energy intercepting and guiding element 30 is a radiant energy source which, in the embodiment of the invention shown, comprises a Xenon linear flash tube 40. The ends of the tube 40 are supported in insulator blocks 42—42 which are attached to angled crosspieces 44—44 secured on vertical members 16 of the outer frame 12. The terminals of the tube 40 are connected to an energizing source (not shown) through leads 46—46. The tube 40 may be of any desired size but preferably is a broad band type having a range from UV to infrared with wavelengths of about 2000 A to 10000 A, and an arc length of 8 inches. Exemplary of such a tube is Model No. FX-77C-8 of EG & G Company.

Arranged below the tube 40 is a vertically adjustable electromagnetic or radiant energy reflecting element 50. The element 50 advantageously comprises a pair of elongated mirrors 52—52. The mirrors 52—52, like the mirrors 32 and 34 desirably are front surface aluminum coated. As shown, the mirrors 52—52 are joined to one another along their inner longitudinal margin 52a and form an approximate right angle along their line of juncture. The ends of the mirrors 52—52 are supported in openings or slots formed in vertically adjustable panels 54—54 secured to the end walls 14b of the inner frame 14 by knurl headed bolts 56 engaged in tapped bores in the end walls 14b through elongated vertical slots 58 formed in the panels 54—54. The panels 54—54 desirably are fabricated of a plastics material such as Plexiglas, or of a light weight metal such as aluminum. Adjustment of the element 50 toward or away from the tube 40 enables greater uniformity of radiant energy distribution to be achieved at the film plane.

Imaging film to be imaged with the apparatus of the present invention is supported on a film receiving member 60. In the preferred embodiment of the apparatus, the member 60 comprises a quartz plate which is supported on the upper margins of the inner frame 14 at the upper open end of the radiant energy intercepting and guiding element 30. The quartz plate advantageously is formed of a high grade quartz available commercially under the designation Amersil, Supersil, Grade T, or $T_2$. The quartz plate can vary in thickness, but desirably has a thickness of the order of about 60 mils to about $\frac{1}{2}$ inch. As best seen in FIG. 5, the upper surface of the member 60 has an image or pattern 60a formed on it. The image or pattern 60a is referred to as a mask, and is formed on the surface of the member 60 by applying a thin layer of a metal such as chromium, for example, on the upper surface of the member 60, and then coating the metal layer with a photoresist. An image is formed in the photoresist layer by exposing it to electromagnetic radiation through a master having an image or pattern corresponding to the image or pattern desired to be formed on the surface of the member 60. Utilizing conventional etching techniques, the desired image or pattern is then etched in the metal layer.

The member 60 is maintained in position on the inner frame 14 by a retaining plate 62 provided with a centrally located rectangular opening 62a. The plate 62 has a recess 62b formed in one side thereof to facilitate removal of a pressure plate 64 and a registration plate 66, each of which is positioned in superimposed relation to film supported on the member 60 during imaging. Projections or pins 68—68 are provided on the retaining plate 62, and are adapted to be received in openings 66a—66a in the registration plate 66.

The imaging film employed with the apparatus of this invention preferably is in the form of a microfiche or microform card. A preferred form of the microfiche or microform card is disclosed in U.S. Pat. No. 3,966,317. As shown in that patent, the card comprises a flexible and substantially transparent synthetic plastic substrate such as Mylar (polyethylene glycol terephthalate), for example, having a thickness in the range of from about 7 to about 15 mils. Coated on the substrate, preferably by vacuum deposition, is a thin, continuous solid layer of an energy dispersible image forming material such as bismuth, or a bismuth alloy, having a thickness of from about 1000 to about 2000 A. The layer of energy dispersible image forming material is heat absorbing, and, in the case of bismuth, has a melting point of about 271° C. A protective overlayer advantageously is applied on the energy dispersible layer. The protective overlayer desirably comprises a substantially transparent synthetic plastic film of Saran, polyurethane, or the like, and has a thickness of about 1 micron. The card measures approximately 4×6 inches.

In utilizing the imaging apparatus to form an image on a microfiche or microform card corresponding to the image or pattern of the quartz mask as represented by the pattern 60a on the member 60, a card having the structure described above is placed on the member 60 with the protective overlayer in contact with the quartz plate. The pressure plate 64 is then placed on the card and the registration plate 66 is positioned in engagement with the studs 68—68 on the retaining plate 62. The Xenon flash tube 40 is energized to provide a short pulse of electromagnetic or radiant energy. The short pulse of energy produced by the tube 40 is within the range of about 1 millisecond to about 40 microseconds, preferably about 100 microseconds. Due to the combined high energy collection efficiency of the element 30 and the element 50, the flash pulse is approximately 40% to 50% shorter than would be otherwise possible. Concomitantly, the energization of the tube 40 can take place at a lower operating potential. These factors combine to appreciably extend the useful life of the tube 40, enabling up to 100,000, or more, flashes to be obtained from a single Xenon tube of the size described above.

The short pulse of energy emitted by the tube 40 readily passes through the transparent areas of the mask 60a formed on the member 60, and the protective overlayer on the energy dispersible material layer comprising the microfiche card, to the layer of energy dispersible material where the energy is absorbed. This absorption of the energy heat by the energy dispersible material at these areas causes the energy dispersible material to become soft or molten, whereupon the continuous solid layer of energy dispersible material at the areas where the energy is absorbed is broken up and dispersed into small and widely spaced globules to make these areas substantially transparent. The dispersion of the energy dispersible material at the energy heated areas is occasioned in the main by the surface tension of the heated material to form such small and widely spaced globules. Again, due to the combined highly efficient energy collecting capabilities of the elements 30 and 50 of the apparatus, and their ability to collimate and direct the energy toward the plane of the microfiche card, dispersion of the energy dispersible material in the areas thereof where energy absorption occurs, takes place substantially uniformly over the entire card. After the globules are so formed by the short pulse of energy from the tube 40, they almost instantaneously cool and remain in that globular condition to provide a sharp, high resolution pattern or image on the card corresponding to the pattern or image of the mask 60a on the member 60.

While the apparatus has been described with relation to the production of a microfiche card on a one by one basis, it should be pointed out that film in roll form, from which individual cards may be cut after imaging, can be fed automatically into the imaging area of the apparatus, and, after imaging, taken up on a roll for later use. Also, the size of the imaging area, and the pattern, on the mask, can be varied as desired to produce smaller cards or to image only a limited area of a card. It should be understood, therefore, that these changes, as well as other modifications, may be made in the preferred form of the invention described herein without deviating from the broader aspects of the invention.

What is claimed is:

1. Apparatus for flash imaging an imaging film having a layer of an energy dispersible image forming material thereon, comprising: an energy source in the form of a flash tube capable of emitting electromagnetic energy of an intensity sufficient to cause dispersion of the energy dispersible image forming material on the imaging film, imaging film support means positioned in spaced relation to the flash tube for enabling electromagnetic energy from the flash tube to be applied to the imaging film in a preselected pattern, electromagnetic energy collecting and channeling means for directing energy from the flash tube to the imaging film at the film support means, said electromagnetic energy collecting and channeling means including a hollow electromagnetic energy passageway and guideway, the longitudinal axis of which is substantially transverse to the longitudinal axis of the flash tube, for intercepting and entrapping a maximum amount of the electromagnetic energy from the the flash tube and directing it to the imaging film whereby substantially the full intensity of the electromagnetic energy is applied to the imaging film thereby enabling rapid and substantially uniform dispersion of the energy dispersible imaging forming material on the film, in a preselected pattern, to be achieved, and adjustable electromagnetic energy collecting and reflecting means positioned adjacent to the flash tube and between the ends thereof in opposed relation to the hollow passageway and guideway of the electromagnetic energy collecting and channeling means, said energy collecting and reflecting means acting to intercept energy from the flash tube and reflect it toward the hollow passageway and guideway of the energy collecting and channeling means and being adjustable toward or away from the flash tube to provide for achieving greater uniformity of electromagnetic distribution at the imaging film plane.

2. Apparatus according to claim 1 wherein the imaging film support means includes masking means bearing an image of at least one area which has a high transmissiveness for the electromagnetic energy from the energy source and at least one other area which has lesser transmissiveness for said energy.

3. Apparatus according to claim 1 wherein the hollow electromagnetic energy passageway and guideway comprises a plurality of substantially parallelly arranged mirrors in contact with one another along their respective adjacent longitudinal margins and having their reflective surfaces positioned in substantially opposed relation to one another.

4. Apparatus according to claim 2 wherein the imaging film support means includes an electromagnetic energy transmissive plate member adapted to support an imaging film on a surface thereof, said plate member having an imaging mask formed on the imaging film supporting surface thereof.

5. Apparatus according to claim 1 wherein the electromagnetic energy source is a linear Xenon flash tube.

6. Apparatus according to claim 4 wherein the energy transmissive plate member is formed of quartz, the upper surface of which carries a metallic mask comprising a pattern for imaging film supported thereon.

7. Apparatus according to claim 1 wherein the adjustable electromagnetic energy collecting and reflecting means comprises a pair of mirrors in contact with one another along one of their margins, and having their reflective surfaces arranged at an angle with respect to one another and facing toward the flash tube.

8. Apparatus according to claim 1 wherein the imaging film is a microfiche card comprising a flexible substrate having a layer of an energy dispersible image forming material on a surface thereof.

* * * * *